Jan. 3, 1928.  1,654,607

J. N. SAXTON

ENGINE LATHE ATTACHMENT

Filed July 13, 1926  2 Sheets-Sheet 1

Inventor
John N. Saxton,
By Clark & Clark,
Attorneys.

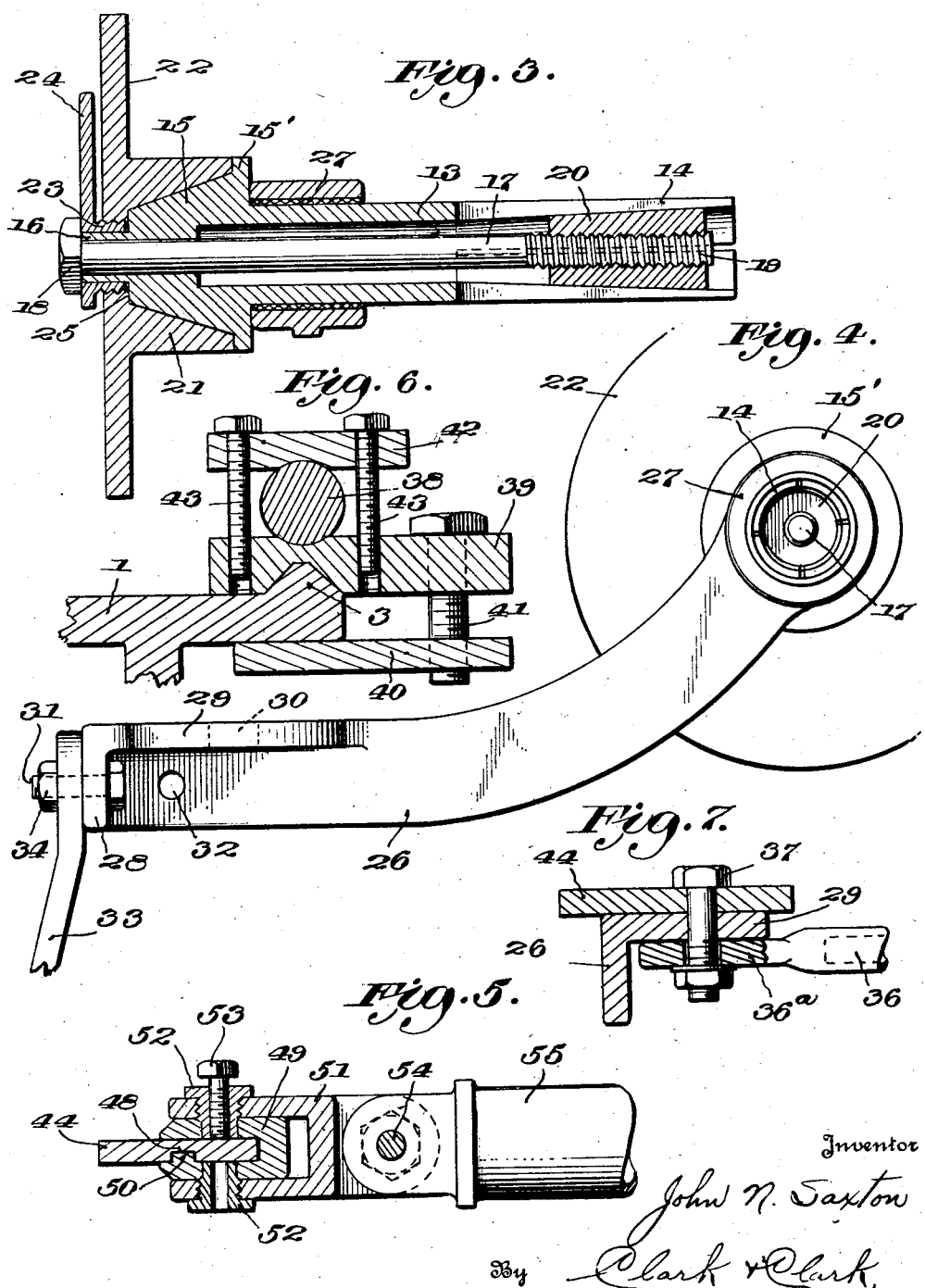

Patented Jan. 3, 1928.

1,654,607

UNITED STATES PATENT OFFICE.

JOHN NELSON SAXTON, OF THERMOPOLIS, WYOMING.

ENGINE-LATHE ATTACHMENT.

Application filed July 13, 1926. Serial No. 122,226.

This invention relates to machine tools, and more particularly to an attachment for engine lathes.

The general object of the invention is to provide a device capable of being readily attached to any one of a number of existing standard types of engine lathes, and serving when so attached, to make it possible to automatically cut spiral grooves either on the inside or outside of journal bearings, spindles, bushings and other substantially cylindrical articles.

It is usual to provide such grooves on bearing surfaces for the purpose of holding and distrubuting the oil, and it has heretofore been usual to form such grooves by means of a special grooving machine.

The present invention seeks to provide an exceedingly simple and practical device, which, in connection with an ordinary lathe, will be capable of doing everything that can be done on one of the special grooving machines referred to, thus enabling a machine shop to cut grooves in bearings and bushings of all kinds by means of a comparatively cheap lathe attachment, and without the necessity of purchasing and maintaining an expensive special machine for this purpose.

More specifically, the present invention seeks to provide an attachment of the characted mentioned which shall operate without gearing of any kind, which can be applied to existing types of lathes without in any way mutilating them or altering their structure, and which can be adjusted to cut grooves of any desired pitch and spacing.

In order that the invention may be readily understood, reference is had to the accompanying drawings, forming part of this specification, and in which:

Fig. 3 is a central longitudinal section on an enlarged scale through my improved driving shaft and associated parts;

Fig. 4 is an end elevation of the parts illustrated in Fig. 3, this view also showing the supporting bar which is journalled on the shaft;

Fig. 5 is an enlarged detail view partly in section and partly in elevation, showing one of my improved rod and lever connections;

Fig. 6 is a transverse section on an enlarged scale on the line 6—6 of Fig. 1;

Fig. 7 is a transverse section on an enlarged scale on the line 7—7 of Fig. 1;

Figure 1:
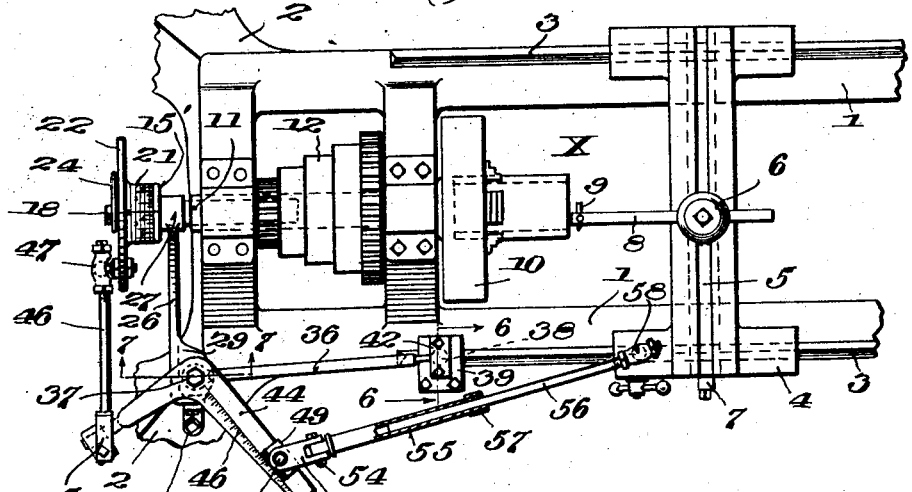
Fig. 1 is a partial plan view of an engine lathe showing my improved attachment applied thereto.

Referring to the drawings in detail, 1 designates the bed of an ordinary engine lathe, supported on the usual legs 2, and provided with the customary ways 3 on which the tool carriage 4 slides. This tool carriage is provided as usual with a transverse slot or way 5 in which is held the tool post 6, such post being transversely adjustable by means of the usual shaft 7. A tool holder 8 is mounted in the tool post 6 and carries at its free end the cutting tool 9.

10 designates the chuck in which the work, shown as a cylindrical bushing X, is centered and held. The chuck 10 is secured to the spindle 11, which, as usual, is hollow. The customary cone pulley 12 and back gears are mounted on the spindle.

Referring now more particularly to Figs. 3 and 4, my improved attachment comprises a tubular shaft 13, of a size to fit snugly within the hollow spindle of the lathe. The inner end of the shaft 13 is split, as indicated at 14, so as to be capable of expanding, and at the other end of the shaft is formed one member 15 of a cone clutch. Extending beyond the end of this cone clutch member is a reduced neck or sleeve 16, and through this neck or sleeve and the interior of the shaft 13 extends a bolt 17. This bolt has at its outer end a head 18 and is provided at its inner end with threads 19 adapted to engage an expansion nut 20, which fits within the expansible portion 14 of the shaft. It will be obvious that when the bolt 17 is turned the head will engage with the sleeve or neck 16 and that the expansion nut 20 will therefore be drawn inwardly, expanding the split portion of the shaft as required.

Fitting over and cooperating with the cone clutch member 15 is a complementary member 21, and secured to and preferably formed integral with the clutch member 21 is a crank disk 22. The center of this disk is bored out considerably larger than the diameter of the neck or sleeve 16 and is threaded to receive a similarly threaded nut 23, which nut carries a lever or handle 24 by means of which it may be turned. This nut is of such a length as to fit between the head 18 of the bolt 17 and a shoulder 25 formed at the end of the clutch member 15. Thus, when the nut 23 and handle 24 are turned in one direction, the outer face of the nut, bearing against the head 18, will force the two clutch members together, while, when turned in the other direction, the inner end of the nut will engage the shoulder 25 and thus force the clutch members apart. The nut 23 and handle 24 thus constitute manual means for moving the clutch members into and out of engagement. When the clutch members are in engagement the crank disk is, of course, locked to the shaft, while, when the clutch members are disengaged, the crank disk is free to turn relative to the shaft.

Referring to Fig. 4, it will be seen that I provide a supporting bar 26, preferably curved as shown, having at one end a bearing sleeve 27 in which the shaft 13 is journalled. The other end of the bar 26 is preferably shaped, as shown, and comprises the vertical flange 28 and the horizontal flange 29. The latter is provided with an opening 30 to receive a pivot pin, as hereinafter described, and the flange 28 and the bar 26 itself are provided with openings 31 and 32 respectively, either of which may receive a bolt 34 for securing to the bar 26 a brace member 33. Whether the hole 31 or the hole 32 is employed in any particular case will depend upon the construction of the particular lathe in question. The lower end of the brace 33 is secured by means of a bolt 35 to the leg or other part of the lathe frame, the length of this brace also depending upon the particular type of lathe being used. As this brace, however, is nothing more than a piece of flat strap iron or steel, it can be easily cut and drilled as occasion requires, to suit any given condition.

Figure 2:
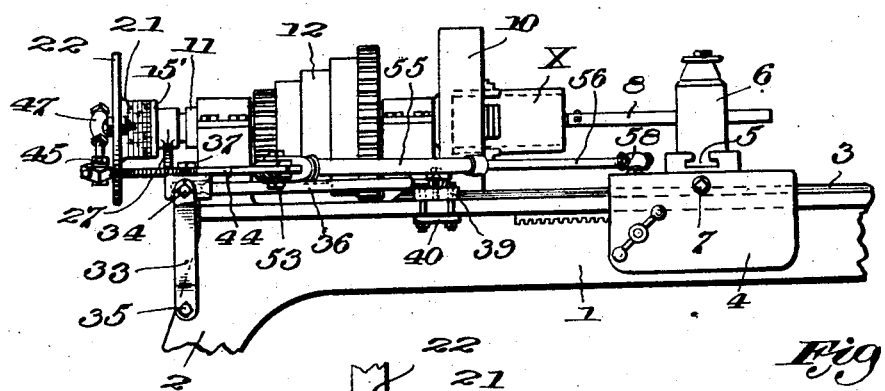
Fig. 2 is a front elevation of the same.

By reference to Figs. 1, 2 and 7, it will be seen that I provide a second brace rod 36, one end of which is flattened and perforated, as at 36$^a$ in Fig. 7, to receive a bolt 37 which passes through the hole 30 in the flange 29 of the bar 26. The other end of the brace rod 36 is made fast to the bed of the lathe, the preferred method of fastening being shown in Fig. 6. Referring to this figure, the end of the rod preferably terminates in a ball 38 and this is received in opposed concave sockets formed in plates 39 and 42, and is held in position by means of bolts 43, as shown. The plate 39 is provided with a groove adapted to fit one of the ways 3 of the lathe bed and is clamped in position on this way by means of a clamping plate 40 and bolt 41. Other methods of securing the brace rod to the lathe bed may, of course, be employed, if desired, without departing from the spirit of the invention. Supported upon the flange 29 and pivotally mounted on the bolt 37 is a bell crank lever 44, best shown in Fig. 1, and it will be seen that this lever, and the pin or bolt 37 on which it is mounted, are supported or braced in three different directions by the bar 26 and the braces 33 and 36. In this way an absolutely rigid bearing for the bell crank lever is provided. This bell crank lever serves to transmit motion from the crank disk 22 to the tool carriage, as will be now described.

To one end of the bell crank lever is pivotally connected by means of a universal joint 45 one end of a pitman rod 46, the other end of which is attached to a crank pin on the disk 22. Preferably the method of attachment is by means of a ball and socket joined as indicated at 47, although other connecting means may be employed if found desirable.

The other arm of the bell crank lever 44 is provided on its under surface with a groove 48 in which slides a tongue 50 formed on a bifurcated block 49 which embraces one edge of the arm 44. The block 49 is itself pivotally mounted between the arms of a second bifurcated member 51 by means of pivot pins 52 which are threaded in the arms of the member 51. A set screw 53 passes through one of the pins 52 and engages the surface of the arm 44 of the bell crank. From this it is obvious that the block 49 may be moved along the arm of the bell crank lever 44 to any desired point in the length thereof and may be then secured in the selected position by means of the set screw 53. Preferably the arm 44 is provided with a scale 46, calibrated in inches or other units of length, to guide the operator in properly setting the block 49.

Connected to the member 51 by a cross pin 54, in such a manner as to constitute with the pins 52 a universal joint, is one end of an extensible rod comprising telescopic sections 55 and 56. These may be locked in adjusted position by means of a compression nut 57 or the like. The end of the rod section 56 is connected as by means of a ball and socket joint 58 with the tool carriage 4.

From the above, it will be obvious that as the lathe spindle revolves the crank disk 22 will similarly revolve and the bell crank lever and the tool carriage will be caused to reciprocate once for every revolution of the spindle. Thus, as the bearing bushing X rotates, the tool 9 will be moved longitudinally thereof, with the result that a spiral groove is cut in the interior surface thereof. The exact character of this groove will depend upon the extent of movement of the tool relative to the length of the bushing, and this extent of movement is, of course, determined by setting the block 49 to the desired position on the bell crank. If the throw of the tool is made greater than the length of the bushing, then an open spiral groove will be cut through the bushing from end to end. If, on the other hand, the throw of the tool is made less than the length of the bushing, a groove in the form of a completely closed spiral or curve will be cut.

Figure 8:
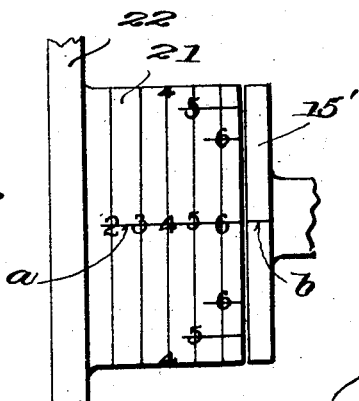
Fig. 8 is an enlarged fragmentary plan view of the index shown at the left of Fig. 1.

It is frequently desired to cut a number of either open or closed spiral grooves in a bearing or the like, such grooves crossing each other at one or more points. In order to enable this to be expeditiously and accurately accomplished, I provide the index shown at the left of Fig. 1 and illustrated in detail in Fig. 8. At the inner end of the cone member 15 I provide a rim or collar 15', and at the periphery of this rim I form a mark or notch, as shown at $b$ in Fig. 8. I then mark or notch the cone or hub member 21 in such a manner as to divide it into a different number of equal parts, that is to say, for example, at opposite sides of the hub I make a mark and place the numeral "2." Similarly, at three equi-distant points I make a mark and place the numeral "3." In the same way I may divide the periphery into four, five or six equal spaces, and at each of the marks dividing these spaces I place the figures "4," "5" or "6," as the case may be. As a starting point, all of the figures may be on one line, as indicated at $a$ in Fig. 8.

The manner of using this index is as follows. If it be desired to cut two grooves 180° apart, the index is first set with the line $a$ opposite the notch $b$, as shown, and the clutch members locked together by means of the nut 23. The lathe is then operated and a groove is cut. Then, the lathe having been stopped, the clutch is released and the crank disk turned until the mark corresponding to the figure "2" on the opposite side of the hub registers with the notch $b$. The lathe is then operated again with the result that a second groove is cut at a point just half-way around the bushing from the first groove. Similarly, by three successive settings of the crank disk, and three successive operations, three equally spaced grooves may be cut. In the same manner, four, five or six equi-spaced grooves may be formed, if desired. It will thus be seen that by virtue of the fact that my improved crank disk is angularly adjustable to any extent desired relative to the shaft and lathe spindle, it is possible to cut any required number of grooves spaced in any desired way around the bushing or other article being operated upon.

Figure 9:
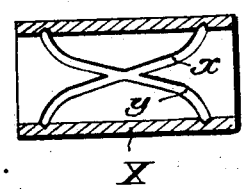
Fig. 9 is a longitudinal section of a bearing bushing, showing one character of grooves which my device is capable of cutting.

In Fig. 9, I have shown, by way of illustration, at $x$ and $y$ two intersecting grooves 180° apart.

It will be understood that where in the specification and claims I use the words "crank disk," I mean to include any crank arm or the like capable of performing the same function. Similarly, where I use the expression "bell crank lever," it is to be understood that a complete disk may be used if preferred. Other changes in the details of construction may obviously be made without departing from the spirit of the invention or the scope of the appended claims.

What I claim is:—

1. An attachment for engine lathes having the usual bed, tool carriage, and hollow spindle, said attachment comprising a shaft adapted to be rigidly mounted within the hollow spindle, crank means carried by said shaft, a pitman rod connected at one end with said crank means, whereby the other end of said pitman rod is caused to reciprocate in a plane transverse to said bed as said spindle revolves, and means for converting the transverse reciprocating motion of the pitman rod into a reciprocating motion in a direction longitudinal of said bed, said means being adapted for connection with the tool carriage.

2. An attachment for engine lathes having a hollow spindle, said attachment comprising a shaft adapted to fit within the hollow spindle, means for locking said shaft to the spindle so that it turns therewith, a crank disk carried by the end of said shaft, and rod and lever mechanism connecting said crank disk with the tool carriage, whereby the latter is reciprocated as the former revolves.

3. An attachment for engine lathes having a hollow spindle, said attachment comprising a tubular expansible shaft adapted to fit within the hollow spindle, means for expanding said tubular shaft to lock it to said spindle, a crank disk carried by the free end of said shaft, and rod and lever mechanism connecting said crank disk with the tool carriage, whereby the latter is reciprocated as the former revolves.

4. An attachment for engine lathes having a hollow spindle, said attachment comprising a shaft adapted to be rigidly mounted within the hollow spindle, a crank disk carried by said shaft, means connecting said crank disk with the tool carriage whereby the latter is reciprocated once for each revolution of the former, and means whereby said crank disk may be angularly adjusted relative to said shaft and spindle.

5. An attachment for engine lathes having a hollow spindle, said attachment comprising a shaft adapted to be rigidly mounted within the hollow spindle, a crank disk carried by said shaft, means connecting said crank disk with the tool carriage whereby the latter is reciprocated once for each revolution of the former, co-operating clutch members rigid with said disk and shaft, respectively, and manual means for engaging and disengaging said members, whereby said crank disk may be locked to the said shaft in any desired angular position relative thereto.

6. An attachment for engine lathes having a hollow spindle, said attachment comprising a tubular expansible shaft adapted to fit within the hollow spindle, an expansion nut in one end of said tubular shaft, a cone clutch member formed at the other end of said shaft, a crank disk having a cooperating cone clutch member, a bolt extending through said shaft, said bolt engaging said expansion nut and also serving to hold said cone clutch members together and means connecting said crank disk with the tool carriage, whereby the latter is reciprocated as the former revolves.

7. An attachment for engine lathes having a hollow spindle, said attachment comprising a shaft adapted to be rigidly mounted within the hollow spindle, a crank disk carried by said shaft, a bell crank lever, a pitman rod connecting one arm of said bell crank lever with said crank disk, and a rod connecting the other arm of said bell crank lever with the tool carriage.

8. An attachment for engine lathes having a hollow spindle, said attachment comprising a shaft adapted to be rigidly mounted within the hollow spindle, a crank disk carried by said shaft, a bell crank lever, a pitman rod connecting one arm of said bell crank lever with said crank disk, a rod connecting the other arm of said bell crank lever with the tool carriage, and means for supporting said bell crank lever, said means comprising a bar journalled at one end on said shaft, and additional brace rods secured to and co-operating with said bar.

9. An attachment for engine lathes having a hollow spindle, said attachment comprising a shaft adapted to be rigidly mounted within the hollow spindle, a crank disk carried by said shaft, a bell crank lever, a pitman rod connecting one arm of said bell crank lever with said crank disk, a rod connecting the other arm of said bell crank lever with the tool carriage, and means for supporting said bell crank lever, said means comprising a bar journalled at one end on said shaft, and substantially vertical and horizontal braces secured to the other end of said bar and adapted to be attached to the lathe frame.

10. An attachment for engine lathes having a hollow spindle, said attachment comprising a shaft adapted to be rigidly mounted within the hollow spindle, a crank disk carried by said shaft, a bell crank lever, a pitman rod connecting one arm of said bell crank lever with said crank disk, and a rod having means at one end by which it may be attached to the other arm of said bell crank lever at any desired point in the length thereof, and at the other end means by which it may be secured to the tool carriage.

In testimony whereof I affix my signature.

JOHN NELSON SAXTON.